(12) United States Patent
Anisimovich et al.

(10) Patent No.: US 8,103,103 B2
(45) Date of Patent: Jan. 24, 2012

(54) MULTILEVEL BIT-MAPPED IMAGE ANALYSIS METHOD

(75) Inventors: Konstantin Anisimovich, Moscow (RU); Vadim Tereshchenko, Moscow (RU); Vladimir Rybkin, Moscow (RU); Dmitry Vnuchkov, Moscow (RU)

(73) Assignee: Abbyy Software Ltd., Nicosia (CY)

( * ) Notice: Subject to any disclaimer, the term of this patent is extended or adjusted under 35 U.S.C. 154(b) by 1973 days.

(21) Appl. No.: 10/386,541

(22) Filed: Mar. 13, 2003

(65) Prior Publication Data

US 2011/0091111 A1    Apr. 21, 2011

(30) Foreign Application Priority Data

Dec. 17, 2002    (RU) .............................. 2002133898 A

(51) Int. Cl.
*G06K 9/46*    (2006.01)

(52) U.S. Cl. ......... 382/195; 382/100; 382/181; 382/276

(58) Field of Classification Search ................ 382/100, 382/181, 185, 224, 276, 195
See application file for complete search history.

(56) References Cited

U.S. PATENT DOCUMENTS

| | | | | |
|---|---|---|---|---|
| 5,321,770 A | * | 6/1994 | Huttenlocher et al. | 382/174 |
| 5,359,667 A | * | 10/1994 | Borowski et al. | 382/138 |
| 5,557,689 A | * | 9/1996 | Huttenlocher et al. | 382/177 |
| 5,594,815 A | * | 1/1997 | Fast et al. | 382/254 |
| 5,848,184 A | * | 12/1998 | Taylor et al. | 382/173 |
| 6,038,342 A | * | 3/2000 | Bernzott et al. | 382/173 |
| 6,408,094 B1 | * | 6/2002 | Mirzaoff et al. | 382/224 |
| 6,912,297 B2 | * | 6/2005 | Scott et al. | 382/112 |

OTHER PUBLICATIONS

A. Jam and Y. Zhong, "Page Segmentation Using Texture Analysis," Pattern Recognition, vol. 29, pp. 743-770, 1996.
J. Ha, R. Haralick, and I. Phillips, "Recursive X-Y Cut Using Bounding Boxes of Connected Components," Proc. Third Int'l Conf. Document Analysis and Recognition, pp. 952-955, 1995.
J, Ha, R. Haralick, and I, Phillips, "Document Page Decomposition by the Bounding-Box Projection Technique," Proc. Third Int'l Conf. Document Analysis and Recognition, pp. 1119-1122, 1995.

* cited by examiner

*Primary Examiner* — Stephen Koziol
(74) *Attorney, Agent, or Firm* — John C. Meline

(57) ABSTRACT

The present invention discloses a multilevel method of bit-mapped image analysis that comprises a whole image data representation via its components—objects of different levels of complexity—hierarchically connected therebetween by spatially-parametrical links. The said method comprises preliminarily generating a classifier of the objects that possibly may be present in the image consisting of one or more levels differing in complexity; parsing the image into objects; attaching each object to one of predetermined levels; establishing hierarchical links between objects of different levels; establishing links between objects within the same level; and performing an object feature analysis. The objects feature analysis comprises at least generating and examining a hypothesis about object features and correcting the object's features of the same and other levels in response to the hypothesis examination results. The step of object features analysis may also comprise execution of a recursive RX-cut within the same level.

10 Claims, 2 Drawing Sheets

MULTILEVEL BIT-MAPPED IMAGE ANALYSIS METHOD

BACKGROUND OF THE INVENTION

1. Field of the Invention

The present invention relates generally to a field of bit-mapped image character recognition systems and, more particularly, to a method of parsing and analysis pre-process assisting character and text recognition of printed text from a bit-mapped binary image or other binary or raster images inputted from a scanning device or the like or obtained by other means.

2. Prior Art

Segmentation and parsing methods are known in the art. Typically, such methods divide an image into parcels containing homogeneous objects and use a plurality of special computing procedures, each depending on a plurality of parameters, to analyze an object.

Known segmentation and parsing methods give little ability to perform a fully complete and overall analysis of objects since they use deficient data. Moreover, said methods require a large number of specialized computing procedures for analysis that depends on the quantity of objects multiplied by the number of parameters thereof.

An example of said type of systems is described in U.S. Pat. No. 6,408,094 Jun. 18, 2002.

Another known kind of method that parses a bit-mapped image into regions with further links startup between objects within the same level and between levels of complexity is described in [1] and U.S. Pat No. 6,038,342 Mar. 14, 2000; U.S. Pat. No. 5,848,184 Dec. 8, 1998.

The main limitations of these methods are a great number of specialized computing procedures required for each of a plurality of object types and a scantiness of obtained subsidiary data that is insufficient and cannot be used to analyze other objects.

Another method of pre-processing before character and text recognition of a printed text obtained from a bit mapped image requires inputting scanned data into a bit-mapped file, parsing it into objects and a further analysis of each type of object by a specific computing means. The essential feature of the method lies in its ability to operate only with shape parameters thereof. The method cannot perform a fully complete and cannot perform overall analysis as it uses no spatial parameters data (U.S. Pat. No. 5,594,815 Jan. 14).

Therefore, the target of the present invention is to develop a bit-mapped image analysis method, not requiring considerable analysis means, obtaining more informative analysis results and higher accuracy than the prior art.

SUMMARY OF THE INVENTION

A multilevel bit-mapped image analysis method is described.

The present invention discloses a method of preliminary multilevel analysis of a bit-mapped image, obtained from a scanner or the like or from any other source. The analysis according to the present invention comprises whole image data representation via its components—objects of different levels of complexity—hierarchically connected therebetween by spatially-parametrical links. In particular the analysis according to the present invention comprises preliminarily classifying all the text and non-text objects that can be present in a document into several levels of complexity, parsing the image into a plurality of regions and objects, attaching every object found in the image to one of the predefined set of levels differing in complexity, performing an analysis of the obtained regions and objects, extracting subsidiary data therefrom and using the said data in analysis, and further outputting the results to a subsequent process, typically to a character recognition process or the like.

The present invention further discloses a method of making this process more informative, increasing analysis and recognition accuracy, reducing a required computing apparatus, and saving system resources.

DETAILED DESCRIPTION OF THE INVENTION

Figure 1:
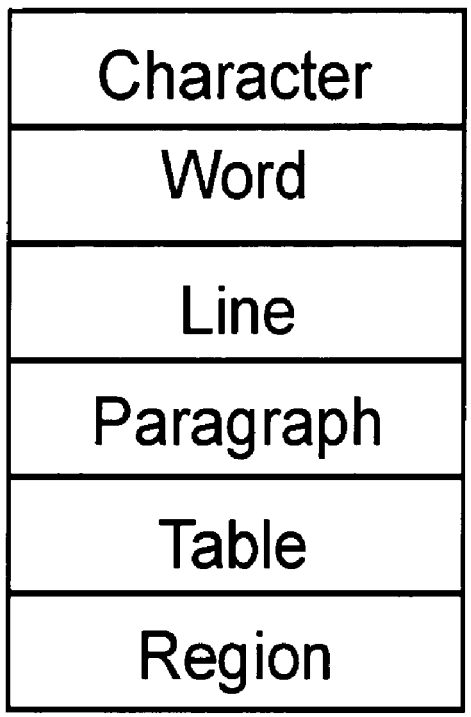
FIG. 1 and FIG. 2 are block diagrams showing some possible samples of classifiers that may be generated in practice. The set, number and the contents of levels can differ greatly from those shown here.

A method of present invention consists in a preliminary analysis of a bit-mapped image and extracting and utilizing the maximum possible amount of supplemental data for the sake of the said analysis.

The most widely known methods deal with parsing of an initial image into objects and further applying a plurality of analyzing means to each parsed object. Thus, the set of computing means for analysis may increase greatly, resulting in an enormous increase in complexity of the whole system.

Most of the known methods use little or none supplemental data, thus losing in accuracy.

The main principle of present invention consists in representing of all bit-mapped image data as a multilevel model, where more complicated objects are defined via their composing less complicated components, in their turn linked therebetween by spatially-parametrical correlations.

Utilizing the method of the present invention, all types of objects that may appear in the analyzed image are preliminarily classified into several levels, differing in complexity. The set of possible levels depends greatly on the layout of the initial bit-mapped image. It can consist of text only, or text with tables, or formatted text with pictures (non-text regions) and/or tables, etc. In each case the classifier will comprise a different set of levels.

After that the whole image is parsed into objects, that is regions, tables, paragraphs, lines, characters, etc.

Then each object is attached to one of the predetermined levels of complexity.

A system of links is established between the objects within each level.

A system of links is established between the objects of different levels.

The analysis can be started at the highest level of complexity or at the lowest level or at any intermediate level depending on the applied strategy.

The object's features comprise at least a list of objects of lower complexity incorporated into the object and a relationship factors estimation of objects within the same level of complexity. The estimation must comprise at least spatial estimations and parametrical estimations.

An important point for utilizing the method of the present invention is that the analysis on any level should comprise at least the steps of setting up a hypothesis about the features of an object, examining the hypothesis about the features of the object and correcting the concerned objects' features of the same and other levels depending on the hypothesis examination results.

To obtain subsidiary data on objects features, a recursive RX-cut on objects can be executed on any level. This can sometimes get more subsidiary data concerning the objects' features, and can confirm a hypothesis concerning the objects of any other level.

The method of a recursive RX-cut is known from prior art. It consists in parsing an image into non-intersected regions within one level of complexity, each region including objects with close spatial and parametrical features. For each region a set of features common to all objects of the region is defined. Then a complete analysis of all regions is performed. Feature restrictions or extensions concerning features common for the regions are added to each region. The corresponding features amendments are made. In the case of any considerable discrepancy between initial and new features of an object, it can be eliminated from the region. As a result of recursive RX-cut analysis some regions with close features, separated by non-text objects, can be combined into a new one. The main result of the analysis and combination of regions lies in obtaining a new volume of subsidiary data on objects' features.

Figure 2:
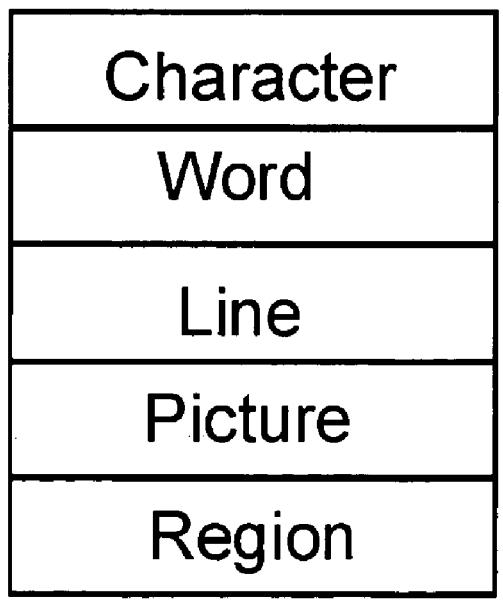

Referring now to FIG. 1 and FIG. 2, the structure of the classifier can vary greatly and depends mainly upon the image layout, the set of possible objects in the image, targets of analysis, etc.

Figure 3:
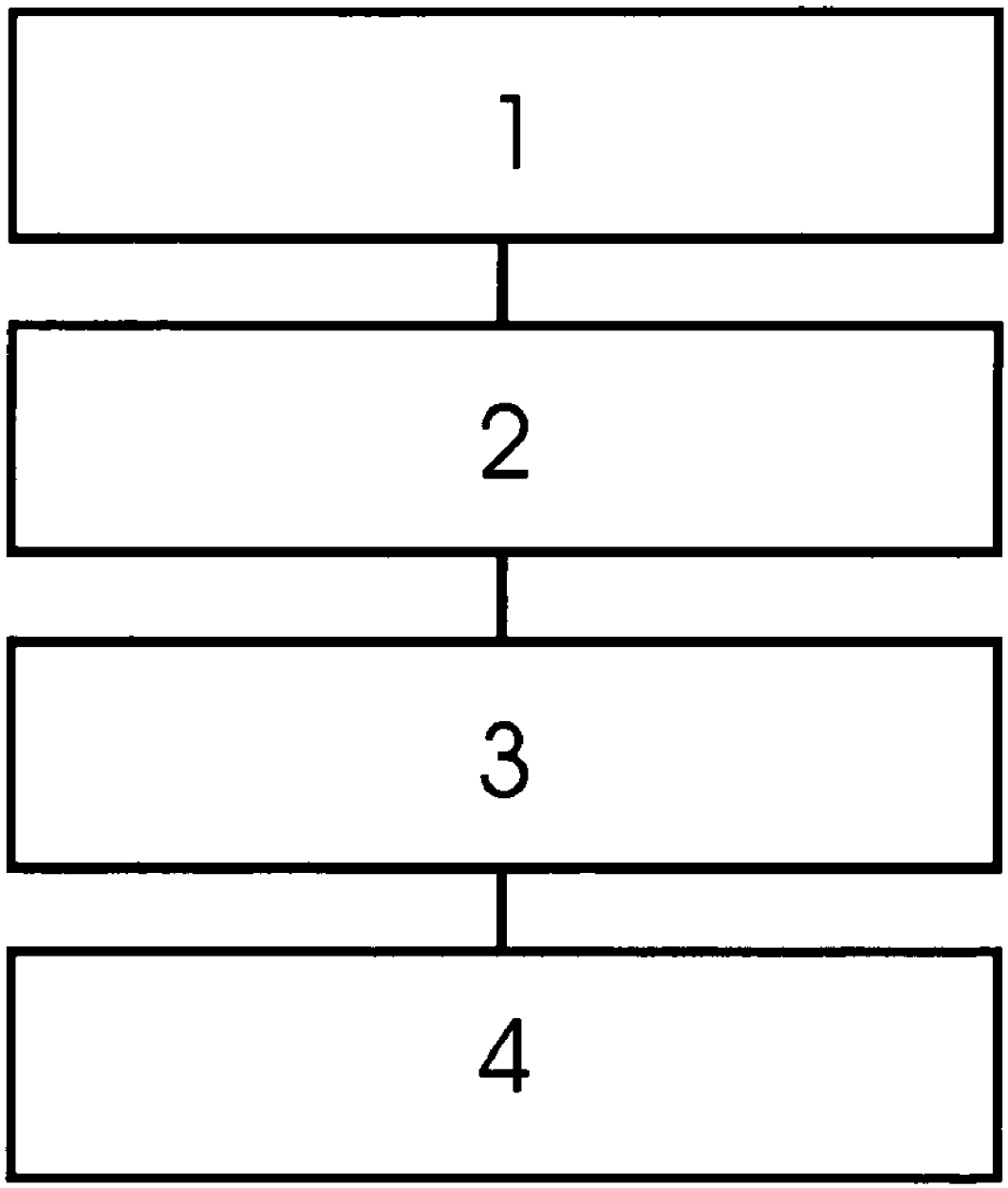
FIG. 3 is a block diagram showing the uniform list of steps to be made on analysis of object of any level according to the present invention.

FIG. 3 shows the uniform list of analyzing steps that should be applied according to the present invention to each object of every level in the course of the analysis process.

Block 1—forming a hypothesis about an object's features; block 2—examining the hypothesis about the object's features; block 3—correcting the concerned objects' features of the same and other levels; block 4—executing at least one recursive RX-cut on objects.

Thus the method of the present invention allows us to apply subsidiary data for analysis, to decrease the necessary set of computing means, to raise accuracy and reduce mistakes in analysis and subsequent processes.

REFERENCES CITED

1. A. Jam and Y. Zhong, "Page Segmentation Using Texture Analysis," Pattern Recognition, vol. 29, pp. 743-770, 1996.
2. J. Ha, R. Haralick, and I. Phillips, "Recursive X-Y Cut Using Bounding Boxes of Connected Components," Proc. Third Int'l Conf. Document Analysis and Recognition, pp. 952-955, 1995.
3. J, Ha, R. Haralick, and I, Phillips, "Document Page Decomposition by the Bounding-Box Projection Technique," Proc. Third Int'l Conf. Document Analysis and Recognition, pp. 11191122, 1995.

We claim:

1. A method of bit-mapped image analysis comprising:
   classifying types of objects that are present within a bit-mapped image into one or more levels differing in complexity;
   parsing the said bit-mapped image into objects
   attaching every said object to one of said levels of complexity;
   establishing links between said objects of said different levels of complexity;
   establishing links between said objects within each level of complexity;
   performing an object feature analysis, said object feature analysis comprising:
      forming a hypothesis about a spatial feature or a parametrical feature of the object, wherein the spatial feature or the parametrical feature is associated with a level of complexity,
      examining the said hypothesis about the spatial feature or the parametrical feature of the object, and
      when necessary, correcting the spatial feature or the parametrical feature of the object of the same and other levels depending on a result from the said examining of the hypothesis.

2. The method as recited in claim 1, wherein said object feature analysis further comprises execution of at least one recursive RX-cut on objects within a same level of complexity.

3. The method as recited in claim 1, wherein said hypothesis about a spatial feature or a parametrical feature of the object comprises at least
   a list of objects of lower complexity incorporated into the object, and wherein the method further comprises outputting the results to a subsequent process.

4. The method as recited in claim 3, wherein said bit-mapped image analysis is performed by moving from a higher complexity level to a lower complexity level and wherein the subsequent process is a character recognition process.

5. The method as recited in claim 1, wherein said bit-mapped image analysis is performed by moving from a lower complexity level to a higher complexity level, and wherein the spatial feature or the parametrical feature of the object includes at least the following data:
   a list of objects of lower complexity incorporated into the object subject to the object feature analysis, and
   a relationship factor estimation of objects within a same level of complexity, said relationship factor estimation including at least a spatial estimation and a parametrical estimation.

6. The method as recited in claim 1, wherein said bit-mapped image analysis is performed by applying the method to any level and further moving to any level in an order and a number of times as determined by the bit-mapped image analysis, and wherein the bit-mapped image analysis is performed by moving from a higher complexity level to a lower complexity level.

7. The method as recited in claim 1, wherein said bit-mapped image analysis is performed by moving from a lower level of complexity to a higher level of complexity.

8. The method as recited in claim 1, wherein said bit-mapped image analysis is performed by applying the bit-mapped image analysis to a given level of complexity and subsequently applying it to a lower level of complexity or to a higher level of complexity.

9. The method as recited in claim 1, wherein the levels of complexity include characters, word tokens, words, lines, paragraphs, regions, tables, and non-text regions.

10. The method as recited in claim 9, wherein after examining a hypothesis at least at one level of complexity, performing a recursive RX-cut to obtain subsidiary data about a spatial feature or a parametrical feature of the same and other levels.

* * * * *